United States Patent [19]

Wild

[11] 3,854,471
[45] Dec. 17, 1974

[54] ULTRASONIC METHOD FOR SYSTEMATIC SEARCH AND DETECTION OF TISSUE ABNORMALITIES

[76] Inventor: John J. Wild, 1100 E. 36th St., Minneapolis, Minn. 55407

[22] Filed: Sept. 15, 1972

[21] Appl. No.: 289,359

[52] U.S. Cl. ................. 128/2 V, 128/2 R, 128/24 A
[51] Int. Cl. ............................................. A61b 10/00
[58] Field of Search ..... 128/2 V, 24 A, 2 R, 2.05 P, 128/2.05 Z; 73/67.6, 67.7

[56] References Cited
UNITED STATES PATENTS

| | | | |
|---|---|---|---|
| 2,919,574 | 1/1960 | Fotland | 73/67.6 |
| 3,403,671 | 10/1968 | Flaherty et al. | 128/2 V |
| 3,480,002 | 11/1969 | Flaherty et al. | 128/2 V |
| 3,547,101 | 12/1970 | Rosauer | 128/2 V |
| 3,577,772 | 5/1971 | Perilhou | 128/2 V |
| 3,603,303 | 9/1971 | Stouffer | 128/2 V |
| 3,605,724 | 9/1971 | Flaherty | 128/2 V |
| 3,745,989 | 7/1973 | Pinna | 128/2 |

*Primary Examiner*—Aldrich F. Medberry
*Attorney, Agent, or Firm*—James R. Cwayna

[57] ABSTRACT

A method and suggested apparatus for systematic search for and diagnosis of the populace particularly for the determination of tissue abnormalities and particularly the systematic analysis of breast tissue for abnormalities which includes an energy source with transmitter and receiver arranged to direct, project and receive a selected source of energy, such as ultrasonic radio frequencies or heat energy, into the area to be examined and to move and project and receive energy through a predetermined path while shifting and direction of projection or reception of energy through a plurality of directions such that the energy will be directed or received normally to or from the skin surface at, at least some portion of the motions or travel including means simultaneously to reveal, assess or measure the energy emitted to determine the presence of tissue abnormalities and upon such determination, to immediately, physically mark the location of such abnormality on the skin such that no additional translations in location are required and further to provide that the person being examined be positioned for a highly effective energy transfer and such mark being made in a position correlative to the location of the abnormality beneath the skin at surgery.

8 Claims, 9 Drawing Figures

PATENTED DEC 17 1974 3,854,471

ULTRASONIC METHOD FOR SYSTEMATIC SEARCH AND DETECTION OF TISSUE ABNORMALITIES

Many concepts of cancer diagnosis and detection are presently known and practiced. With applicant's method and apparatus for utilizing ultrasonic energy as disclosed herein for detection of tissue abnormalities, an instantaneous numerical read-out as well as a physical marking of the skin at the location of the abnormality is obtained. With applicant's invention, the primary objective thereof is to obtain optimal and maximum transfer and reception of the energy to and from the areas of examination, through the skin and into the tissues therebelow, which optimal and maximum energy transfer will be maintained through the skin and into the tissues therebelow, which optimal and maximum energy transfer will be maintained even though there may be irregularities in the contour of the skin of the subject after proper positioning of the subject. Applicant's major contribution to optimal and maximum energy transfer and reception includes the positioning of the patient to flatten the majorities of curvatures, for example, by having a woman patient repose on her back during the examination procedure such that the breast will be substantially flat due to both the balancing of the patient and forces of gravity acting on the breast.

It is an object of applicant's invention to provide a system which is capable of rapid and large scale examination of women to detect the presence of cancerous tissues and other abnormalities.

It is a further object of applicant's invention to provide apparatus and structure to determine the presence of tissue abnormalities, particularly breast cancer abnormalities and to provide a precise location thereof and to mark the skin over the abnormality to provide a definite surgical location of the abnormality relative to the surface of the skin.

It is a further object of applicant's invention to provide a method and apparatus for positioning the individual to be examined in a first balanced testing position which test position will provide for the most effective energy transmission through the skin by substantially flattening the area of testing.

It is a further object of applicant's invention to so position the patient for testing such that this position may and will be reproduced for operative procedures and therefore the information obtained during the testing procedures will be directly useable during the operative procedures.

It is still a further object of applicant's invention to provide a systematic examination procedure for determining the presence of tissue abnormalities wherein it will be possible to determine when and where abnormalities are present and whether the abnormality is malignant of non-malignant, this determination being accomplished by the characteristics of the amount of energy received or reflected from the particular abnormality.

It is still a further object of applicant's invention to provide a system which eliminates the inconsistencies of examination that may result from skin irregularities and contours or which may also result from movement of living tissues caused by respiration and cardiovascular pulses by providing a system which is sufficiently rapid to overcome any in-vivo situations and which system is sufficiently mobile to transfer and receive the energy at any particular instant at an angle normal to the skin.

These and other objects and advantages of applicant's invention will more fully appear from the following description made in connection with the accompanying drawings, wherein like reference characters refer to the same or similar parts throughout the several views, and in which.

In accordance with the accompanying drawings, applicant illustrates and provides a means and more importantly a system for the mass examination of patients for abnormalities that may be cancerous. This system includes the determination of abnormalities and further provides the determination of whether or not the abnormality is malignant or non-malignant.

In order to provide mass examinations, immediate determinations rather than slower techniques that produce and record visual images which require later interpretation are necessary. Applicant's invention provides a means for immediate signaling of diagnosis, location and determination of the nature of the abnormality.

In applicant's concept, particularly in the present preferred form thereof, a beam of ultrasonic energy is moved in such a manner that it will completely traverse and expose the tissue to be examined to the sound beam and the reflection from the tissues that are being examined will give an immediate response such as instantaneous numerical readout to indicate abnormalities in a form such as percentage of reflection as compared to reflection from normal tissue and will indicate from this formation whether abnormalities are malignant or non-malignant. It is necessary when using ultrasonic techniques to insure that there is a maximum transfer of energy through the skin and into the under lying tissues and therefore to accomplish this requirement, applicant provides two advances over the prior art.

The first such advance includes the placement of the patient and the second includes the assurance of normal incidence of the energy beam to and through the skin even though there are certain irregularities either in the skin surface or in the particular curvature of the skin in the area to be examined.

Figure 1:
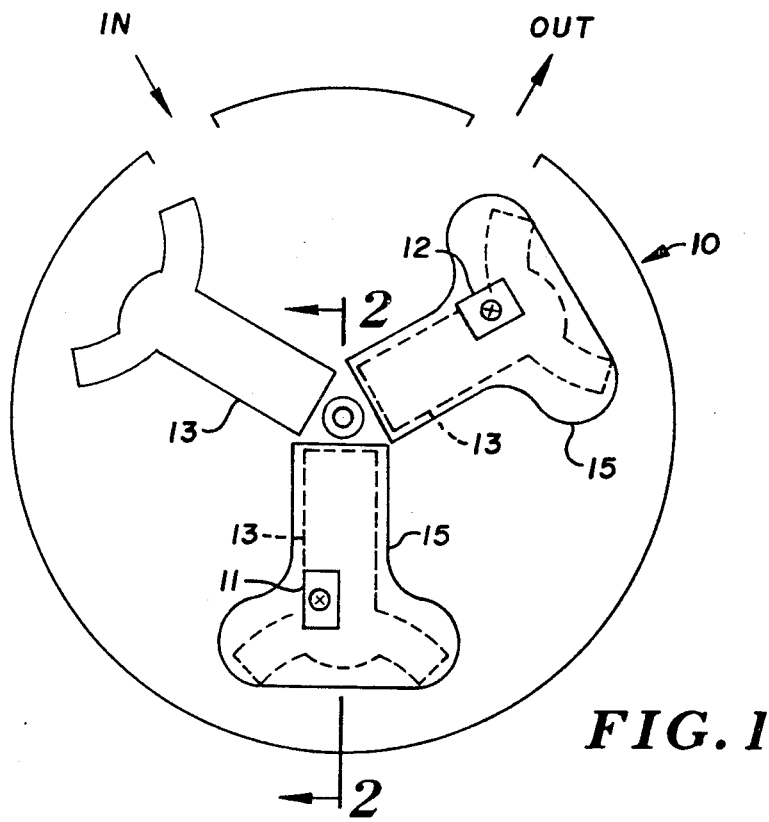
FIG. 1 is a top plan view of simple systematic examination area illustrating a plurality of examination stations for use in the mass examination of patients.
Figure 2:
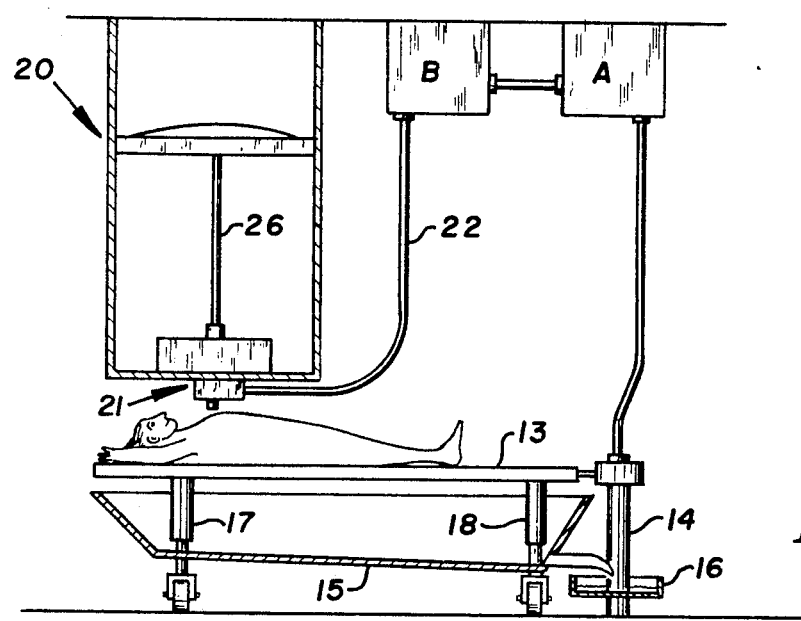
FIG. 2 is a vertical section taken along Line 2—2 of FIG. 1 illustrating a patient support device.

The first consideration of patient positioning is illustrated in FIGS. 1 and 2. In FIG. 1 an examination area 10 having a purality of examination stations 11, 12 for examination of the individual breasts is provided. A table or support device, and in this case three such supporting devices 13 to provide for continuous examination of a number of patients are provided. The shape of the table is designed to permit the patient to lie with her arms raised to be adjacent her head such that the tissue of the breast will tend to flatten out and the axillary tail will be positioned correctly. In prior art situations, examinations of breasts have been made with the patient lying face down with her breasts suspended in water. Having the patient lie on her back substantially flattens the breast and this flattening results in an advantage of extending the breast area such that the possibility of abnormalities being screened by additional abnormalities in front of or adjacent thereto is substantially reduced. In other words the possibility of two abnormalities being arranged in front of one another with respect to the examining tool is virtually impossible with this reposing position. Applicant's device and particularly the supporting device 13 are designed to permit balancing of the breasts on the underlying chest wall and further to include the effects of gravity to substantially flatten the breast tissue and this flattening permits not only examination of the main breast tissue proper but also permits examination of the periphery of the breast including the axillary tail portion.

This balancing and proper orientation of the supporting table 13 and supported patient is obtained by providing a purality of adjustable leg members, 17, 18, preferably two such adjustable leg members 17 being arranged generally below the upper back or thorax of the patient such that the supporting device 13 and the patient lying thereon may be tilted to properly position the breast of the patient. As illustrated, the supporting device is mounted for rotation about a central pivot 14 and a collector bath 15 is provided below the supporting area 13 to drain into a collector system 16 for reuse. When utilizing ultrasonic energy, acoustic fluid couplng is most effective for energy transmission and provision for acoustic coupling fluid is provided for each of the tables 13.

It is not without the scope of this invention to provide a water tight enclosure that would encircle the chest area and to simply fill this enclosure with an acoustic transmission fluid to be used as the energy transmission medium and if such a modification were employed, it is obvious that the recycling and collection system would not be necessary.

The apparatus to control the movement of the sound transmission head 21 in a prescribed path is designated in its entirety 20 and the service conduit is designated 22. The source for providing the ultrasonic energy is designated B and the apparatus for degasing filtering and recycling of the acoustic coupling fluid is designated A. Such source and fluid treatment systems A and B are well known in the art and a detailed description of such devices is not considered to be necessary.

It should be noted that in the views of FIGS. 1 and 2 an examination situation such as disclosed herein would provide for a purality of persons being either examined or in preparation stages for examination.

Applicant has designated his sound head movement control system generally as 20. Three individual systems for such control are illustrated respectively in FIGS. 4 and 5, FIGS. 6 and 7 and FIGS. 8 and 9 which will be discussed hereinafter.

Figure 3:
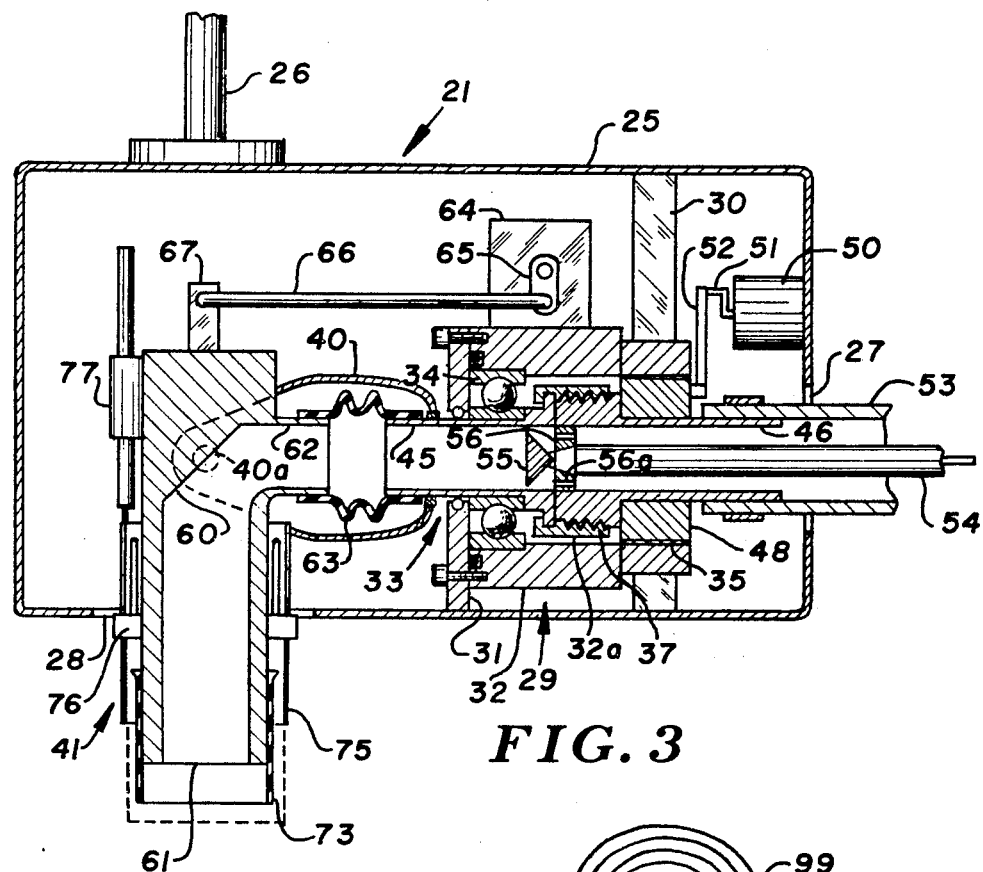
FIG. 3 is a vertical section taken through the transmitting, receiving device utilized to practice the concept of applicant's invention.

A suggested sound head construction whcih operates as both a transmission for energy as well as a collector for the reflected energy is best illustrated in the generally vertical cross section of FIG. 3 and which unit has been previously designated as 21 in FIG. 2. In the form shown a housing 25 is provided which is connected to a control shaft 26 and which housing provides a service conduit aperture 27 and an opening 28 for the transmission element for the delivery and reception of energy. It should be obvious that although the applicant has illustrated a selected configuration for this sound head, that a number of other such designs could be produced and rather it is the concept of the various distinct movements available with this sound head that are important to insure the proper direction and reception of energy normal to the skin and the tissues lying therebelow.

A first transducer carrying section is designated in its entirety 29 and includes a rear mounting member consisting of a purality of radially extending rib members 30 attachable to the housing 25. A similar frontal support member 31 is provided and a housing 32 having a passage 32a therethrough is provided between such support members 30, 31 such that a transmission member 33 is mounted for rotation within the passage 32a of the housing 32.

In order to provide such rotation, a front bearing member 34 is provided within the passage 32a and the rear supporting section 30 likewise provides a bearing surface 35 for transmission member 33. Basically this entire carrying section 29 provides a positive support structure for the transmission member 33 and in addition to this provides a forwardly extending support member 40 attached to a selected portion of which provides a support arm for the energy beam directing and receiving member designated in its entirety 41 which member 41 is pivotally attached to the support member 40 through a pair of trunion members 40a, only one of which is shown.

The transmission member 33 includes, in the form shown, a frontal section 45 and rear section 46 which sections are joined through a threaded connection element 37 such that separation of the same may be accomplished. Frontal section 45 is rotatably supported in the bearing 34 and the rear section 46 is provided with a radially, outwardly extending bearing and drive element 48 arranged to oscillate upon the bearing surface 35 of the rear support 30. This oscillation is obtained through an eccentric driving mechanism driven by a motor 50 and including a drive crank 51 and a driving link 52. Obviously to permit such, what may be termed rotary oscillation, the mounting of the beam directing support arm 40 must permit such movement and therefore this arm 40 must rotate with transmission element 33.

Arranged externally of the rear support 46 is a connective member 53 in the form of a water supply conduit sealing secured to the periphery of the member 46. Inwardly of the conduit 53 and the support member 46 is a transmission line 54 for the transmission of energy which extends therein to a trnasducer element 55. Surrounding the transducer mounting end and the line 54 is an inner support member 56 having a purality of passages 56a therethrough for the flow of the couplng fluid such that the energy is carried to the surface to be examined by means of this fluid coupling.

The beam directing member 41 is comprised of, in the form shown, an L-shaped housing having a sound reflective surface 60 angularly disposed therein to reflect the energy delivered thereto from the transducer 55 to the outlet end 61 of the housing 41 and to likewise reflect the energy emanating from the tissues being examined. The inlet end 62 of the beam directing member 41 is connected to the forward end of the frontal support member 45 through a tubular, flexible, bellows section 63 such that rotary oscillation of the beam direction member 41 is premitted. Oscillation of the beam direction member 41 is obtained through a driving device 64 mounted on the carrying section 29 and driving is obtained through an eccentric link combination 65, 66 attached to a link 67 on the beam directing member 41. As this driving device, including all the links thereof, is energized it should be obvious that an oscillatory motion will be provided to the directing member 41 about the attachment pivot points 40a. The motions of the soundhead 21 to this point should be obvious. The soundhead is maintained with respect to the support rod 26 such that it will follow a prescribed path and that the oscillation of the beam directing head 41 is always coincident therewith. The rotary oscillation provided by the driving mechanism 50 will be normal to such path and applicant has found that this rotary oscillation should be substantially less than the inline oscillation of the directing head 41 provided by the driving mechanism 64 and its links.

The motions of the beam directing portion 41 at this point then develop oscillations in two directions and as will be described hereinafter when combined with the control structures of FIGS. 5 and 6 and FIGS. 8 and 9 a tri-directional motion is obtained which motion is no available with normal compound scanning equipment and this motion provided by applicant insures that normal beam incidence to the skin will occur at some point during examination.

Arranged at the lower most end of the beam directing member 41 is a flexible boot member 73 such that the unit may actually contact the skin of the individual being examined.

A marking device is also provided for immediate and physical marking of the position of the discovered abnormality. In the form shown, a movable ring member 75 provided with a dye or other marking substance circumscribes the end of the directing member 41 and this member 75 is guided for reciprocation through a bearing member 76 and is actuated by a device such as a solenoid 77 arranged thereabove with connection obviously being made thereto. This marking device is actuated in response to a predetermined reading of sonic energy reflection characteristics indicative of a cancerous or malignant abnormality.

Figure 5:
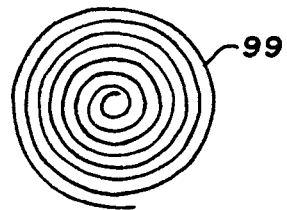
FIG. 5 is a section taken along Line 5—5 of FIG. 4.
Figure 4:
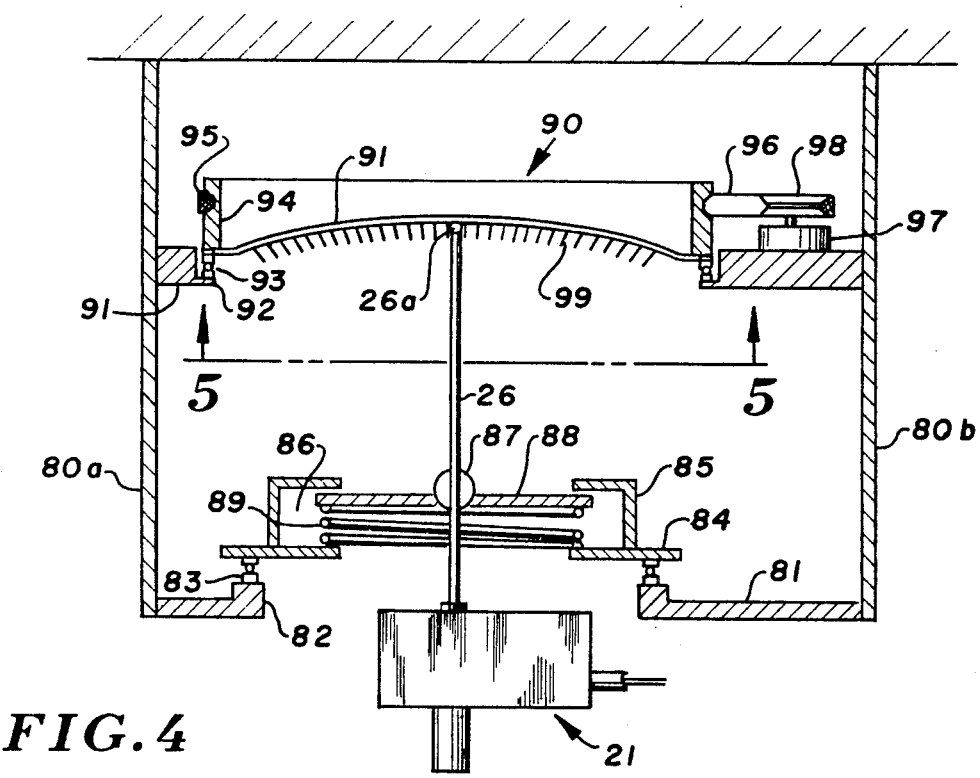
FIG. 4 is a substantially vertical section taken through means to control and direct the transmitting and receiving head.

A first form of the means for controlling the motion of the sound head 21 previously designated as 20 in FIG. 2 is illustrated in FIGS. 4 and 5. In the form of the invention illustrated therein a first pair of supporting struts or the like 80a, 80b are provided and these are arranged to suspend the entire moving means from a supporting surface such as a ceiling or the like. As illustrated in FIG. 4 a breast C in its properly balanced flattened position is illustrated with the sound head 21 being positioned vertically thereabove. The positioning, balancing and flattening of the breast C is obtained through the shiftable positioning of the support member 13 upon which the patient reposes.

In the form shown, a first lower supporting member 81 is provided having an aperture 82 therethrough and upon which a circular thrust bearing or the like 83 is provided to maintain a first plate member 84 and spring 89 holding combination thereabove. An upper retaining element 85 L-shaped and inverted is positioned above the plate 84 such that a vertical movement area 86 is provided thereby for movement of the soundhead 21 through a certain vertical distance. The aforementioned guide rod 26 extends vertically from the soundhead 21 upwardly through a first vertical bearing and ball member 87 which ball member is arranged for movement in a first plate 88 which plate 88 is arranged in captured relation to the spring or biasing member 89 such that the biasing member 89 will normally urge the plate 88 upwardly in the vertical travel area 86. In this form, this entire lower construction permits a certain vertical movement of the soundhead 21 and permits a certain controlled movement of the soundhead due to the spherical ball mounting 87 arranged on plate 88.

Spaced upwardly from the lower housing arrangement, a guiding mechanism designated 90 in its entirety is provided. As illustrated herein a generally circular guide 91 is supported by supports 80a, 80b and has an aperture 92 therein with a shoulder providing a bearing seat for bearing 93 to permit rotation of the contoured and defining guiding element 91 thereon. Guide 91 is generally circular in shape and adjustably contoured to effect a three dimensional cam to approximate the shape of a flattened breast. Obviously this contoured member could be of a flexible material to permit conformity thereof to the shape of the breast. In the form illustrated in FIG. 4 this guide member 91 is supported about the periphery thereof with an upstanding ring member 94 having a drive belt groove 95 therein which groove is provided with a belt member 96 which belt member is in turn driven by a motor 97 and sheave combination 98.

Arranged on the lower periphery of the conduit member 91 is a spiral guide system which in its cross section as illustrated in FIG. 4 provides a purality of downwardly disposed and spirally arranged elements designated 99. These elements basically are formed through the definition of a spiral coil as illustrated in FIG. 5 such that the upper end 26a of the guide rod 26 will follow along this spiral path as defined by these guide members 99 as the guide 91 is rotated through the operation of the motor 97 and the accompanying belt 96. As illustrated herein the spiral configuration will guide the rod 26 and thus the soundhead 21 in a spiral movement from the nipple outwardly around the breast. Obviously means may be provided to control the shifting of the rod and thus the soundhead 26 such that the sector oscillation resulting from the drive motor 64 and the accompanying linkage 65, 66, 67 is always in agreement with the path of the spiral being executed about the breast while the waggle generated by the motor 50 and the linkage 51, 52 will always be normal to this movement. It should be obvious that with the contour defined with the guide member 91 vertical motion of the soundhead will occur and the guiding member 26a will always remain in contact with the contouring plate 91 due to the upward thrust of the spring member 89 located in the lower portion of the unit.

The entire concept of this spiral examination procedure is to provide a tri-directional movement as mentioned hereinbefore where a predetermined path will be followed while the multiple motions of the transducer within unit 21 are operative. In this concept then at some point during each oscillation of the energy transmission unit, the energy transmitted and received will be substantially vertical to the skin and the underlying tissues. Upon finding an abnormality, depending upon the degree of response selected by the operator, the marking physically applied to the breast will be accomplished with the actuating solenoid 77 device.

Figure 6:
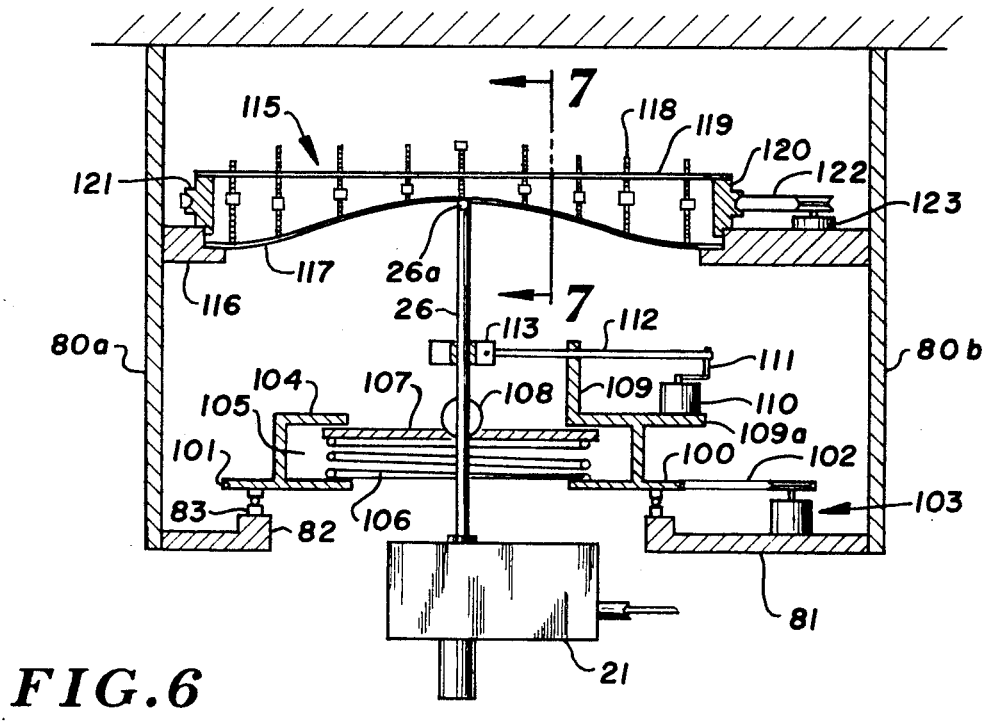
FIG. 6 is a vertical section taken through a second form of the means to control the transmitting and receiving head.

A second form of the invention to provide a second soundhead movement is provided in FIG. 6. In this particular illustration, the same as in the first form, support rods 80a, 80b are provided which extend downwardly to a first support plate 81 again provided with an aperture 82 therein with a bearing member 83 mounted thereon to permit certain rotary motions of a spring encapturing mechanism which again is utilized in this particular form of the invention. There are slightly different modifications in this form of the invention and in this case the lower plate member is designated 100 and is again circular in shape to ride upon the bearing 83 and is provided with an aperture therethrough to permit rod 26 to pass therethrough and move therein and this plate 100 at this point is provided with an exterior belt receiving area 101 within which a belt is placed which belt is designated 102 and is driven by a motor and sheave combination designated 103. Arranged upwardly of the plate is an inverted L-shaped member 104 providing an oscillation area 105 with the oscillation being provided with a spring 106 driving a plate 107 vertically within the oscillation area 105. A ball member 108 is provided to be bearingly supported by the plate 107 such that free movement of the rod 26 is permitted to the plate and thus the soundhead 21 is permitted to move in the required directions.

In this particular form a vertical support member 109 is provided on the aforementioned L-shaped member 104 and a motor mount 109a is provided to extend radially outwardly therefrom and this motor mount section is designated to support a motor 110 having an eccentric crank arrangement 111 thereon which crank arrangement is in turn linked to a control arm 112 and is attached to a bearing and driving member 113. This driving and bearing member 113 is devised to permit vertical oscillation of the rod 26 therein while imparting oscillation thereto.

Figure 7:
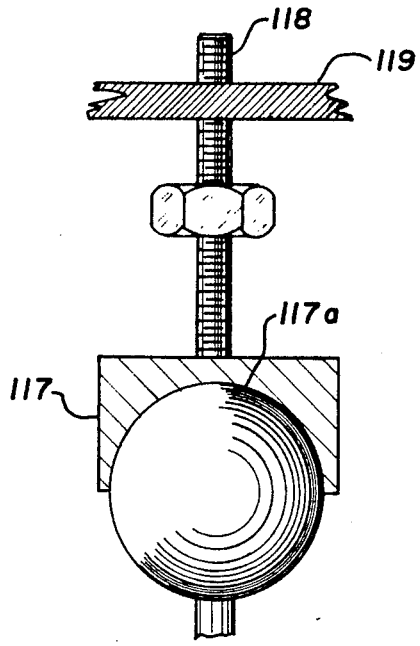
FIG. 7 is a vertical section taken along Line 7—7 of FIG. 6.

In this form the upper movement describing member designated 115 is again supported through a circular flange system 116 and this flange system 116 supports a guide member 117 which takes the form as illustrated in FIG. 7 an adjustable forming member which provides an arcuate capturing section 117a designed to capture the upper head 26a of the rod 26 such that the same will be guided therein as same as shifted longitudinally along this guide member 117. Guide member 117 is flexible such that through a plurality of adjustment members 118 extending upwardly through a support member 119 the particular configuration of the guide member 117 is controllable. Support member 119 is provided in and across a ring member 120 which ring member is provided with a belt receiving groove 121 therearound to be driven through a belt 122 and motor 123.

One important consideration in this design is that the motor 103 and the motor 123 must be syncronized such that any angular shifting in one motor; particularly the lower motor 103 will result in a corresponding angular shifting of the upper motor 123 and the thus guide section 117.

In this configuration, the applicant provides a means by which the soundhead will move across the breast in a straight line and after completion of one crossing of the breast C a shifting of the lower motor 103 through an angular resulution will result in a shifting of the upper motor 123 through an identical angular resolution to thus align the same for another movement across the breast. This arrangement provides means to establish an X-Y plot, a parallel plot of the breast must be simply be transversed in a plurality of radially extending examination strokes. During the examination of the breast in this manner, the inline function of the sound direction head 41, controlled by the motor 64 and linkage 65, 66, 67 will be agreeable with the movement along the guiding element 117 while the waggel as delivered through the motor 50 and linkage 51, 52 will be normal thereto. In this manner then a tri-directional situation is again established and again the process of normally impinging upon a surface is obtained. As should be obvious from a consideration of FIGS. 4 and 6 the vertical movement of the soundhead is obtained through contouring of the support plate 91 in the form of FIG. 4 and by the adjustment of the setting mechanism 118 to control the positioning of the guide rod 117 in FIG. 6. Obviously this whole situation could be accomplished through a template device wherein a template is laid over the flattened breast C and the same is translated into the controlled motion and this certainly is not without the scope of the invention.

Figure 8:
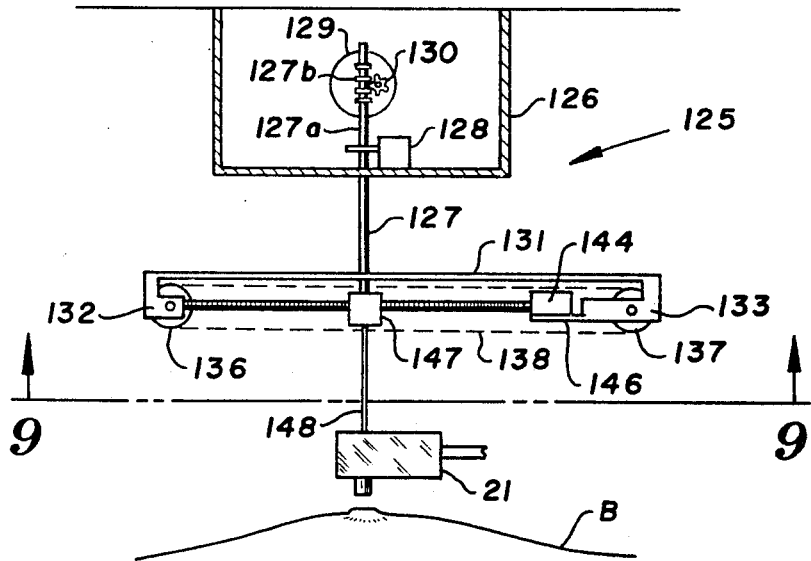
FIG. 8 is a side elevation through a third form of the means to control the transmitting head; and, FIG. 9 is a horizontal section taken along Line 9—9 of FIG. 8.
Figure 9:
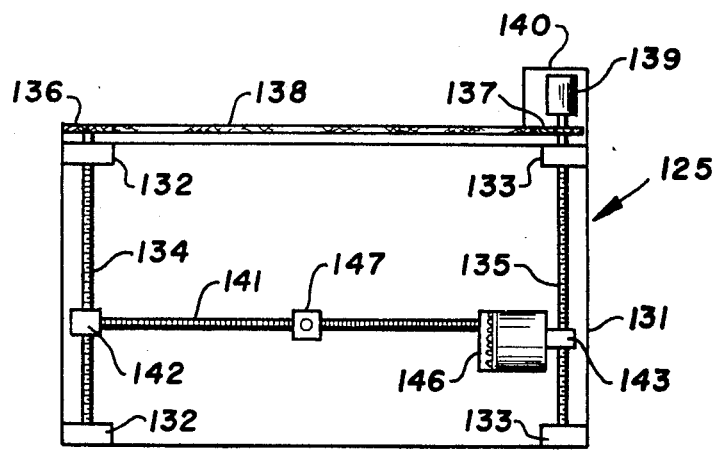

A third form of the invention provides a means for coordinating all of the movements as shown in the previous control figures and with the device as disclosed in FIGS. 8 and 9, means for obtaining an X-Y parallel, spiral or radial examining stroke is provided and which device also includes a means for automatically elevating the unit to maintain a predetermined distance from the skin that will aid in insuring maximum energy transfer.

In the form shown in FIGS. 8 and 9 the soundhead designated 21 is provided and mounted on a systematic tracking and control unit designated in its entirety 125. The unit 125 for controlling the movement of the sound head 21 includes a bracket member 126 for mounting the same to a support surface such as the ceiling or the like and includes a first shaft 127 which has a splined portion 127a at the upper end thereof to permit the same to be rotated through a motor 128 such that the shaft 127 and ultimately the soundhead 21 connected thereto may be rotated if so desired. The upper most end 127b of the shaft 127 is provided with a rack arragnememt such that through the utilization of a second motor 129 having a driving cog 130 thereon, it will be possible to lift or lower the shaft and therefore the attached soundhead 21 in relation to surface of the breast. Motor 129 may, through certain control and sensing devices arranged in conjunction with the soundhead 21, elevate the shaft 127 and the attached soundhead 21 to maintain the same at a predetermined distance from or in contact with the skin of the breast that is being examined. This type of control motor again is well known in certain electronic arts and a complete description thereof is deemed to be unessential. Shaft 127 is connected to a first mounting plate 131 which mounting plate is provided with a pair of downwardly extending support elements 132, 133 which support elements consist of pairs of supports located at the outboard edges of the support plate 131 and in the form shown a pair of drive screws 134, 135 are located between the supports and sprockets 136, 137 are mounted thereon with a drive chain 138 arranged to drive members 136, 137 providing coordination between the rotation of screws 134, 135. Motor 139 is provided to drive these coordinated screws and this motor is mounted on an extension 140 of the support plate 131.

Extending between screws 134, 135 is a third screw member 141 which is mounted for rotation between traveling blocks 142, 143 such that as the screws 134, 135 rotate the third screw 141 will be moved therealong. A motor 144 is provided on mounting plate 146 to drive the screw 141 such that a third follower 147 will follow therealong when the same is rotated and thus particularly through the illustration shown in FIG. 9 the follower 147, which holds the ultimate support shaft 148 to the energy transmitting and receiving head 21, will be moveable in both axis of an X-Y plane. In this manner then it should be obvious that when an X-Y plot is required the motor 144 will drive the follower 147 and thus the attached soundhead 21 in one direction to track across the breast and the screws, 134, 135 after such movement will be advanced by the motor 139 to an additional increment in the direction perpendicular to the initial scan of the follower 147. This movement obviously would be in conjunction with the motor 129 which will sense the displacement of the soundhead vertically above the breast B and the entire support plate 131 may be moved vertically thereby maintaining soundhead to skin distance.

In order to obtain either a circular or spiral tracking of the breast, the follower 147 and the associated drive screw 141 therewith will be centered above the breast nipple and through coordination of the motor 144 driving the follower 147 and the motor 128 rotating the shaft 127 and thus the entire attached support plate 131 it will be possible to coordinate the functions thereof such that a spiral movement could be coordinated to produce a circular tracking situation or the unit could be coordinated to provide a radial tracking situation. Also in all of these movements provided in this third form of tracking control it should be obvious that the sector and waggle motions for the soundhead are provided to insure the maximum transfer of energy through perpendicular transmission and reception of the energy beam.

It should be obvious that a rapid examination of breast tissues is provided through the structure as set forth herein and by utilizing the concepts as set forth herein. The instantaneous read-out is available by instantaneous electronic interpretations of the reflection characteristics of the energy. It is therefore not necessary to transpose this information for later reading of photographic reproductions of the information which reproductions also require the development of the information bearing material and interpretation thereof.

It should be obvious that applicant has provided a unique concept of examination techniques wherein multi-directional energy transmission and reflection characteristics are utilized and wherein the patient is reposed in a position that is comparable to the operative position in which she will be placed for operation.

I claim:
1. Method for systematic examination and detection of tissue abnormalities including:
   a. providing an ultrasonic energy transmitting source to provide a tissue intercepting beam and receving source therefor;
   b. positioning said source in close association to the tissue to be examined;
   c. moving said source in a first predetermined direction over the tissue in a path;
   d. oscillating said beam of energy in a first plane, said first plane being substantially coincident with and in the same direction of movement of said source across the tissue; said oscillating beam of energy being simultaneously transmitted in a second plane generally normal to said first plane and therefore generally normal to the directions of movement across the tissue;
   e. continuing moving the source and its beam oscillations in different but closely adjacent paths;
   f. providing interpretation means for the instantaneous processing and readout of said beam energy receiving means and,
   g. said interpretation means including means for quantitatively reading the energy returned from the tissue whereby conversion of such energy to a delayed visual form is eliminated.

2. The method as set forth in claim 1 where said interpretation means includes means for processing and numerical conversion of the energy being received.

3. The method set forth in claim 1 and the degree of angular oscillation of the beam of energy in said first plane being greater than that of the oscillation in said second plane.

4. The method as set forth in claim 1 wherein the tissue is in in-vivo condition and includes the female breast and including the steps of
   a. reposing the female on her back on a support device; and,
   b. adjusting the support device to balance and substantially flatten the breast on the thorax.

5. The method as set forth in claim 1 and including the step of instantaneously physically marking the tissue in response to a predetermined reception of energy read out above a predetermined level of energy.

6. The method as set forth in claim 1 wherein movement in said path includes movement defining a spiral-lying plot from a predetermined central location.

7. The method as set forth in claim 1 and including the step of maintaining the position of said source at a predetermined location with respect to the tissue.

8. The method as set forth in claim 1 and said beam oscillations being arranged to direct the beam to strike the tissue being examined at not only a normal angle of incidence but at different angles during such oscillation.

* * * * *